United States Patent
Tian et al.

(10) Patent No.: US 9,448,400 B2
(45) Date of Patent: Sep. 20, 2016

(54) DISPLAY DEVICE

(75) Inventors: Xiaoxiong Tian, Beijing (CN); Jianshe Xue, Beijing (CN); Jisheng Zhao, Beijing (CN); Lin Li, Beijing (CN); Shi Shu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 365 days.

(21) Appl. No.: 13/469,533

(22) Filed: May 11, 2012

(65) Prior Publication Data
US 2012/0287030 A1    Nov. 15, 2012

(30) Foreign Application Priority Data

May 13, 2011  (CN) .......................... 2011 1 0124740

(51) Int. Cl.
*G09G 3/34* (2006.01)
*G02B 26/02* (2006.01)

(52) U.S. Cl.
CPC .................................. *G02B 26/026* (2013.01)

(58) Field of Classification Search
CPC .................................................. G02B 26/026
USPC ......... 345/107, 110, 204, 214, 690, 211–212
See application file for complete search history.

(56) References Cited

U.S. PATENT DOCUMENTS

| | | | |
|---|---|---|---|
| 2002/0126261 A1 | 9/2002 | Nomura et al. | |
| 2006/0114374 A1 | 6/2006 | Segawa et al. | |
| 2007/0153160 A1* | 7/2007 | Lee et al. | 349/95 |
| 2007/0236768 A1* | 10/2007 | Kawahara et al. | 359/237 |
| 2007/0285597 A1* | 12/2007 | Wu et al. | 349/95 |
| 2007/0295973 A1* | 12/2007 | Jinbo et al. | 257/88 |
| 2008/0036951 A1* | 2/2008 | Tsai et al. | 349/110 |
| 2008/0100907 A1 | 5/2008 | Lipovetskaya et al. | |
| 2009/0127440 A1* | 5/2009 | Nakai | 250/227.2 |
| 2011/0141087 A1* | 6/2011 | Hiji et al. | 345/211 |
| 2012/0008075 A1* | 1/2012 | Kwon et al. | 349/108 |
| 2012/0135138 A1* | 5/2012 | Lipovetskaya et al. | 427/162 |
| 2012/0268447 A1* | 10/2012 | Tomotoshi et al. | 345/212 |

FOREIGN PATENT DOCUMENTS

| | | |
|---|---|---|
| CN | 1963654 A | 5/2007 |
| CN | 1782835 A | 6/2007 |
| CN | 101782706 | 7/2010 |

OTHER PUBLICATIONS

First Chinese Office Action dated Feb. 27, 2014; Appln. No. 201110124740.2.
Third Chinese Office Action Appln. No. 201110124740.2; Dated Jan. 19, 2015.
Second Chinese Office Action Appln. No. 201110124740.2; Dated Sep. 19, 2014.

* cited by examiner

*Primary Examiner* — Quan-Zhen Wang
*Assistant Examiner* — Tony Davis
(74) *Attorney, Agent, or Firm* — Ladas & Parry LLP

(57) ABSTRACT

An embodiment of the disclosed technology provides a display device comprising an electrophoresis solution tank containing electrophoresis solution and at least a rolling ball used for display colors, the rolling ball being immerged into the electrophoresis solution; and a shelter layer disposed above and covering the electrophoresis solution tank, the shelter layer being made up of an opaque material. A light transmitting hole is formed in the shelter layer and above the core of the rolling ball, so that the light of the color to be currently displayed on the rolling ball passes through the light transmitting hole for display, while the light of the colors not intended to be displayed is blocked by the shelter layer.

20 Claims, 2 Drawing Sheets

DISPLAY DEVICE

BACKGROUND

Embodiments of the disclosed technology relate to a display device.

The rolling ball display technology is a newly developed display technology in which a single ball needs to display more than one color so as to achieve a better color display performance. This requires a single ball to have more than one color on its surface, even to be full-color, and also requires these colors to be reasonably distributed.

Due to an increasing number of colors appearing on the surface of a single ball, the effective color region for an individual color to be displayed at a certain moment covers a decreasing area on the surface of the single ball. However, a viewer may receive a larger display region in which other colors than that is intended may be displayed. Thus, not only the intended color but also other color(s) may come into view, causing the so-called color mixing effect which deteriorates the display performance.

SUMMARY

An embodiment of the disclosed technology provides a display device comprising an electrophoresis solution tank containing electrophoresis solution and at least a rolling ball used for display colors, the rolling ball being immerged into the electrophoresis solution; and a shelter layer disposed above and covering the electrophoresis solution tank, the shelter layer being made up of an opaque material, wherein a light transmitting hole is formed in the shelter layer and above the core of the rolling ball, so that the light of the color to be currently displayed on the rolling ball passes through the light transmitting hole for display, while the light of the colors not intended to be displayed is blocked by the shelter layer.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

An embodiment of the disclosed technology provides a display device capable of avoiding the color mixing effect in realizing multi-color display, so as to achieve a clear and uniform display performance.

Figure 1:
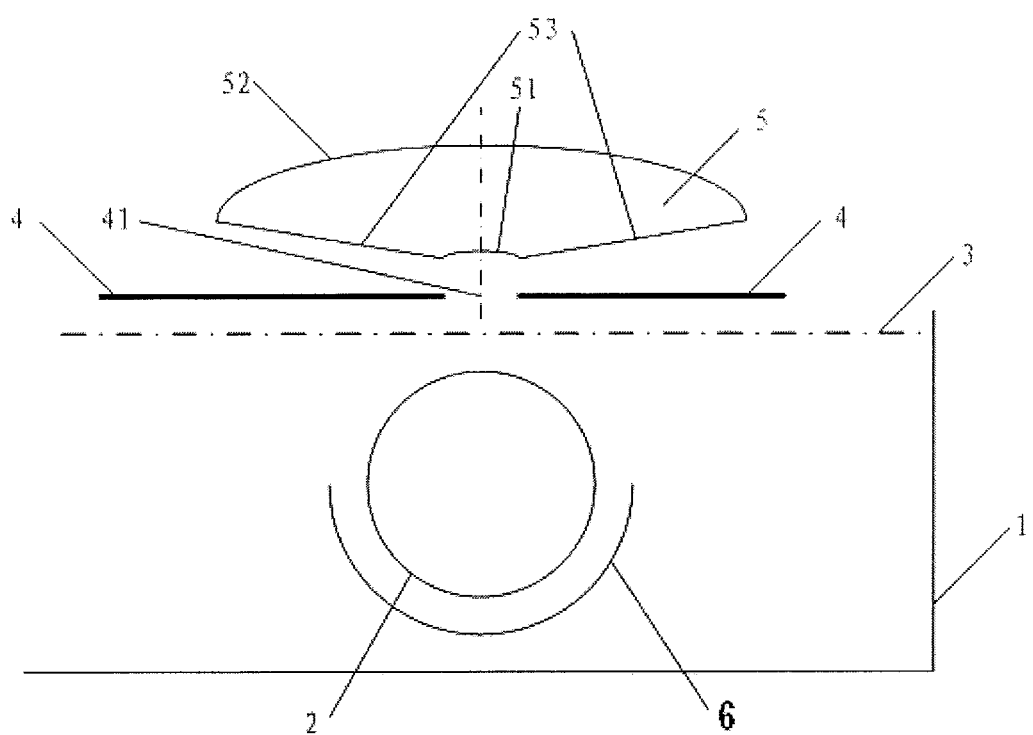
FIG. 1 is a structural schematic view showing a display device according to an embodiment of the disclosed technology.

As shown in FIG. 1, the embodiment of the disclosed technology comprises an electrophoresis solution tank (or container) 1 containing electrophoresis solution 3, at least a rolling ball 2 immerged into the electrophoresis solution 3, and an electrode 6 corresponding to the rolling ball 2.

The display device further comprises a shelter layer 4 disposed above and covering the top of the electrophoresis solution tank 1. The shelter layer 4 is made up of an opaque material.

The shelter layer 4 has a light transmitting hole 41 disposed above the core or sphere center of the rolling ball 2 so as to make the light of a certain color to be currently displayed pass through but block the light of other colors not intended from being currently displayed.

Thus, the light of the color to be currently displayed on the rolling ball may pass through the light transmitting hole 41 and appears on the display device, while the light of the colors not intended to be displayed on the rolling ball is blocked by the shelter layer 4.

In the display device of the embodiment of the disclosed technology, only the color light to be currently displayed is displayed in a predetermined space, while the color light not intended to be currently displayed is blocked by the shelter layer 4. Therefore, the color mixing effect in realizing multi-color display can be avoided, and a clearer and uniform display performance can be achieved.

In an embodiment of the disclosed technology, the rolling ball 2 can be completely immerged into the electrophoresis solution 3, as shown in FIG. 1. The light from the rolling ball 2 can be the light emitted from the display device itself or the light reflected by the rolling ball 2. That is, the display device of the embodiment of the disclosed technology may be an active type display device or a reflective type display device. If the display device of the embodiment of the disclosed technology is an active type display device, the display device emits light itself and can display better in a darker condition. The rolling ball 2 as well as the electrode 6 in the active display device may be transparent to the light. In this case, a light source can be disposed behind or under the electrode 6, functioning as a backlight module. Furthermore, the light source of the display device can also be disposed inside or outside the rolling ball 2. Regardless of the location of the light source, the light from the light source should at least illuminate the region of the color to be currently displayed on the surface of the rolling ball 2. When the display device in the embodiment of the disclosed technology is a reflective type display device which do not emit light itself, the environment light is reflected to display an image. In this case, the image will be displayed more clearly with more intensive environment light. Moreover, the color to be currently displayed may be a single color or a mixing color.

In an embodiment of the disclosed technology, the shelter layer 4 can be provided on a spacer between adjacent rolling balls 2, i.e., adjacent pixels. In this case, the spacer can be used to support the shelter layer 4 and may be used for individually separating the rolling balls 2 (i.e., adjacent pixels) and preventing the electrophoresis solution 3 from flowing between the pixels.

The rolling ball 2 displays the color to be currently displayed by bringing the region of the color to be currently displayed on the rolling ball 2 right above (i.e., atop) the core of the rolling ball 2. Thus, the light of the color to be currently displayed can be emitted outwards through the tank containing the electrophoresis solution 3. In an embodiment of the disclosed technology, a light transmitting hole 41 through which the light of the color to be currently displayed on the rolling ball 2 may be transmitted outwards can be formed in the shelter layer 4 and right above the rolling ball 2 by a photolithography process.

Figure 2:
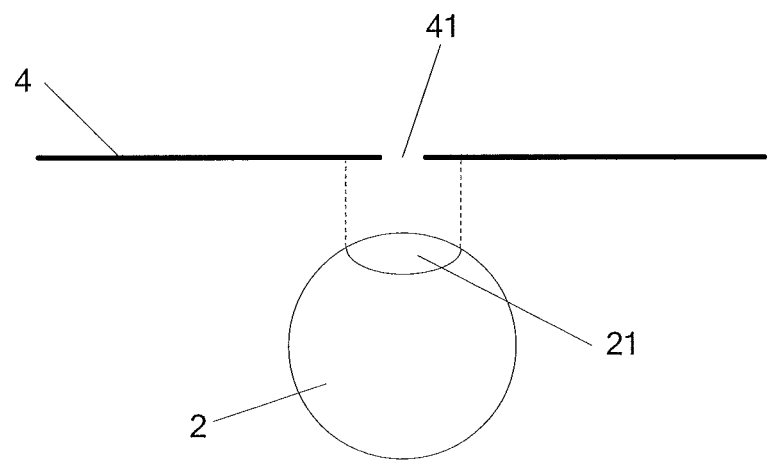
FIG. 2 is a first schematic view showing a relationship between a light transmission hole and a region of a color to be currently displayed on a rolling ball in the display device according to an embodiment of the disclosed technology.
Figure 3:
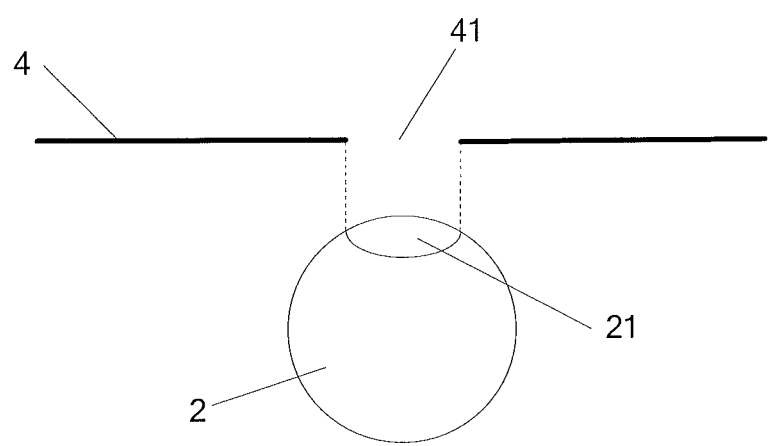
FIG. 3 is a second schematic view showing another relationship between a light transmission hole and a region of a color to be currently displayed on a rolling ball in the display device according to an embodiment of the disclosed technology.

The size of the light transmitting hole 41 is related to that of the region of the color to be currently displayed on the rolling ball 2. In particular, the size of the light transmitting hole 41 relates to that of the perpendicular projection of the region of the color to be currently displayed of the rolling ball 2 on the shelter layer 4. FIGS. 2 and 3 show the relationships between a light transmission hole 41 and a region 21 of the color to be currently displayed on a rolling ball 2 in the display device according to embodiments of the disclosed technology. As shown in FIG. 2, the size of the light transmitting hole 41 is smaller than that of the perpendicular projection of the region 21 of the color to be currently displayed of the rolling ball 2 on the shelter layer 4. As shown in FIG. 3, the size of the light transmitting hole 41 is equal to the size of the perpendicular projection of the region 21 of the color to be currently displayed of the rolling ball 2 on the shelter layer 4. The color of the region 21 to be currently displayed may be any color, such as, red, green, blue, etc.

In addition, the size of the light transmitting hole 41 can also be determined as desired as long as the color mixing effect can be avoided.

In an embodiment of the disclosed technology, the shelter layer 4 can be formed by an opaque material, for example, a black photoresist, an inorganic ceramic, or other materials.

The display range of the display device according to the embodiments of the disclosed technology may become narrow, due to the small display area of the rolling ball 2 functioning as a pixel of a display device and the adoption of the shelter layer 4 for blocking the color light not intended to be currently displayed and only passing the light of the color to be currently displayed.

Therefore, in an embodiment of the disclosed technology, the display device may further comprise an enlargement component 5 for enlarging the display range of the color light passing through the light transmitting hole 41 so that the display performance of the color to be currently displayed can be enhanced. Thus, in the display device according to the embodiment of the disclosed technology, the color mixing effect be can avoided due to the shelter layer 4 with the light transmitting hole 41 formed therein, and the display performance of the color to be currently displayed can be enhanced by an enlargement component capable of enlarging the display range of the color light passing through the light transmitting hole 41.

An example of the enlargement component 5 in the embodiments of the disclosed technology is a component capable of causing light to diverge. In an example, the enlargement component 5 has a light collecting surface 51 on the side close to the shelter layer 4 so as to collect the color light transmitted from the rolling ball and passing through the light transmitting hole 41, while it has a light diverging surface 52 on the side away from the shelter layer 4 so as to cause the light collected by the light collecting surface 51 to diverge, thus enhancing the display performance.

In an embodiment of the disclosed technology, the size and shape of the enlargement component 5 may be determined as desired as long as it can ensure the collection of all or part of the color light transmitted from the rolling ball 2 and passing through the light transmitting hole 41 and the enlargement of the display range of the color light passing through the light transmitting hole 41 by the way of diverging. In an example, the light collecting surface 51 of the enlargement component 5 may be formed to be a concave spherical surface which fully covers the region of the color to be displayed on the rolling ball 2 so as to collect enough light so that the enlargement component 5 can work better to amplify the region of the color to be displayed on the rolling ball. On the other hand, the size of the light collecting surface 51 is determined to avoid a color mixing effect which is caused by collection of the light of the color of the electrophoresis solution 3. Also, the curvature of the light collecting surface 51 should be large enough; otherwise it is disadvantageous for enlarging the view angle of the display device. In another example, when the enlargement component 5 is horizontally placed, the size of the perpendicular projection of the light collecting surface 51 on the shelter layer 4 is equal to that of the light transmitting hole 41.

The enlargement component 5 can be provide above the shelter layer 4 or attached to the shelter layer 4. In an example, as shown in FIG. 1, if the enlargement component 5 is a convex lens, the axes of the enlargement component 5 and that of the light transmitting hole 41 are in the same line, that is, the enlargement component 5 and the light transmitting hole 41 are coaxially disposed.

The portion of the enlargement component 5 except the light collecting surface 51 and the light diverging surface 52 (e.g., the portion indicated by 53 in FIG. 1) can be opaque or frosted so as to avoid the collection and enlargement of light from the shelter layer 4. Therefore, the color mixing effect can be further avoided.

It should be realized that if the display device in the embodiment of the disclosed technology is a reflective type display device in which the environment light (natural light) is used as the light source, the surface 52 of the enlargement component 5 can function as a light collecting surface for collecting the environment light and the surface 51 can function as a light converging surface for causing the light collected by the surface 52 to converge at the rolling ball 2. That is, the environment light illuminates the rolling ball 2 after passing through the surface 51, the surface 52 and the light transmitting hole 41. When the light impinging onto the rolling ball 2 is further reflected outwards, the enlargement component 5 may enlarge the display range of the color light passing through the light transmitting hole 41 again, and in the process, the surface 51 works for collecting the color light passing through the light transmitting hole 41, and then the surface 52 works for causing the light collected by the surface 51 to diverge. It can be seen that the environment light impinging or irradiated onto the surface of the rolling ball 2 is intensive as being converged by the cambered (or arched) upper and lower surfaces, i.e., the cambered surfaces 51 and 52 as shown, of the enlargement component 5. When the environment light is reflected by the rolling ball 2, due to the reversibility of the light paths, the cambered surfaces 51 and 52 of the enlargement component 5 acting as an light diverging component may cause the light to diverge also, thus enlarging the display range of the color light passing through the light transmitting hole 41. Therefore, the light collection and reflection in a reflective type display device can be fulfilled by setting the surfaces 51 and 52 to a suitable curved surface, such as a cambered surface.

In an example of the disclosed technology, the enlargement component 5 may be a convex lens formed of acrylic resin, glass or the like.

In addition, in the display device of an example of the disclosed technology, a capping layer (e.g. a substrate of the display device) can be provided on the shelter layer 4 for protection and support, and the upper and lower sides of the capping layer above the shelter layer 4 can be formed (for example by pressing) to form a plurality of convex lenses connected successively according to the number of the rolling ball 2. In another example, only the side of the capping layer close to the electrophoresis solution tank 1 is processed to form convex lens. Thus, there is no need to provide separate enlargement component 5, and the display range can be enlarged as well.

In the display devices according to the examples set forth above, above the electrophoresis solution tank containing at least a rolling ball immerged into an electrophoresis solution, there is provided an opaque shelter layer with a light transmitting hole above the core of the rolling ball, so that the light of the color to be currently displayed on the rolling ball can pass through the shelter layer and finally appear on the display side of the display device, while the light of the colors not intended to be displayed is blocked by the shelter layer. Therefore, the color mixing effect in realizing multicolor display can be effectively avoided, and a clear and uniform display performance can be achieved. Furthermore, a more comfortable display performance and increasing of brightness can be obtained by enlarging the display range of the color light passing through the shelter layer in some examples of the disclosed technology.

The disclosed technology being thus described, it will be obvious that the same may be varied in many ways. Such variations are not to be regarded as a departure from the spirit and scope of the disclosed technology, and all such modifications as would be obvious to those skilled in the art are intended to be comprised within the scope of the following claims.

What is claimed is:

1. A display device comprising:
   an electrophoresis solution tank containing electrophoresis; and
   a shelter layer disposed above and covering the electrophoresis solution tank, the shelter layer being made up of an opaque material,
   wherein the display device, in a pixel, further comprises only one rolling ball for the pixel and an electrode embracing a part of the rolling ball, the rolling ball has plural colors on its surface, the rolling ball and the electrode embracing the part of the rolling ball are immerged into the electrophoresis solution, a light transmitting hole is formed in the shelter layer and right above the core of the rolling ball, the light transmitting hole is aligned with the core of the rolling ball so that the light of the color to be currently displayed on the rolling ball passes through the light transmitting hole for display, while the light of the colors not intended to be displayed on the rolling ball is blocked by the shelter layer; and
   a size of the light transmitting hole is smaller than a size of the rolling ball.

2. The display device according to claim 1, wherein the shelter layer is formed of black photoresist or inorganic ceramic.

3. The display device according to claim 2, wherein the size of the light transmitting hole is smaller than or equal to that of a perpendicular projection of the region of the color to be currently displayed on the rolling ball onto the shelter layer.

4. The display device according to claim 1, further comprises an enlargement component for enlarging the display range of the color light passing through the shelter layer.

5. The display device according to claim 4, wherein the enlargement component is provided above the light transmitting hole of the shelter layer.

6. The display device according to claim 5, wherein the enlargement component may be a convex lens formed of acrylic resin or glass.

7. The display device according to claim 5, wherein the size of the light transmitting hole is smaller than or equal to that of a perpendicular projection of the region of the color to be currently displayed on the rolling ball onto the shelter layer.

8. The display device according to claim 4, wherein the enlargement component comprises:
   a light collecting surface on the side close to the shelter layer so as to collect the color light transmitted from the rolling ball and passing through the light transmitting hole.

9. The display device according to claim 8, wherein the enlargement component further comprises:
   a light diverging surface on the side away from the shelter layer so as to cause the color light collected by the light collecting surface to diverge.

10. The display device according to claim 8, wherein the enlargement component may be a convex lens formed of acrylic resin or glass.

11. The display device according to claim 9, wherein the portions of the enlargement component except the light collecting surface and the light diverging surface is opaque or frosted.

12. The display device according to claim 9, wherein the enlargement component may be a convex lens formed of acrylic resin or glass.

13. The display device according to claim 11, wherein the enlargement component may be a convex lens formed of acrylic resin or glass.

14. The display device according to claim 4, wherein the enlargement component may be a convex lens formed of acrylic resin or glass.

15. The display device according to claim 4, wherein the size of the light transmitting hole is smaller than or equal to that of a perpendicular projection of the region of the color to be currently displayed on the rolling ball onto the shelter layer.

16. The display device according to claim 1, wherein the size of the light transmitting hole is smaller than or equal to that of a perpendicular projection of the region of the color to be currently displayed on the rolling ball onto the shelter layer.

17. A display device comprising:
   an electrophoresis solution tank containing electrophoresis solution; and
   a shelter layer disposed above and covering the electrophoresis solution tank, the shelter layer being made up of an opaque material,
   wherein the display device, in a pixel, further comprises only one rolling ball for the pixel and an electrode embracing a part of the rolling ball, the rolling ball has plural colors on its surface, the rolling ball and the electrode embracing the part of the rolling ball are immerged into the electrophoresis solution, a light transmitting hole is formed in the shelter layer and right above the core of the rolling ball, the light transmitting hole is aligned with the core of the rolling ball so that the light of the color to be currently displayed on the rolling ball passes through the light transmitting hole for display, while the light of the colors not intended to be displayed on the rolling ball is blocked by the shelter layer; and an enlargement component configured for enlarging the display range of the color light passing through the shelter layer is disposed over the shelter layer.

18. The display device according to claim 17, wherein the enlargement component is provided above the light transmitting hole of the shelter layer.

19. The display device according to claim 17, wherein the enlargement component comprises:

a light collecting surface on the side close to the shelter layer so as to collect the color light transmitted from the rolling ball and passing through the light transmitting hole.

20. The display device according to claim 17, wherein the enlargement component further comprises:

a light diverging surface on the side away from the shelter layer so as to cause the color light collected by the light collecting surface to diverge.

* * * * *